(12) United States Patent
Chen et al.

(10) Patent No.: US 7,057,898 B2
(45) Date of Patent: Jun. 6, 2006

(54) DEVICE RETENTION MECHANISM

(75) Inventors: Yun-Lung Chen, Tu-Cheng (TW); Da-Long Sun, Shenzhen (CN)

(73) Assignee: Hon Hai Precision Industry Co., Ltd. (TW)

( * ) Notice: Subject to any disclaimer, the term of this patent is extended or adjusted under 35 U.S.C. 154(b) by 59 days.

(21) Appl. No.: 10/872,906

(22) Filed: Jun. 21, 2004

(65) Prior Publication Data
US 2005/0088813 A1  Apr. 28, 2005

(30) Foreign Application Priority Data
Oct. 24, 2003  (TW) ............................... 92218919 U

(51) Int. Cl.
*G06F 1/16* (2006.01)
(52) U.S. Cl. ................... 361/725; 361/610; 312/223.1; 312/223.2
(58) Field of Classification Search ................. 361/610
See application file for complete search history.

(56) References Cited

U.S. PATENT DOCUMENTS

| | | | |
|---|---|---|---|
| 4,501,460 A * | 2/1985 | Sisler ........................ 361/730 |
| 5,032,952 A | 7/1991 | Cooke et al. | |
| 5,172,305 A | 12/1992 | DeWilde | |
| 5,745,342 A * | 4/1998 | Jeffries et al. .............. 361/683 |
| 5,777,848 A | 7/1998 | McNanally et al. | |
| 5,995,364 A * | 11/1999 | McAnally et al. .......... 361/685 |
| 6,530,628 B1 * | 3/2003 | Huang et al. ............. 312/223.2 |
| 6,582,150 B1 | 6/2003 | Davis et al. | |
| 6,726,509 B1 * | 4/2004 | Milan ...................... 439/752.5 |
| 6,751,100 B1 * | 6/2004 | Chen ......................... 361/725 |
| 6,944,013 B1 * | 9/2005 | Yang ......................... 361/683 |
| 2004/0032712 A1 * | 2/2004 | Chen et al. ................. 361/685 |

* cited by examiner

*Primary Examiner*—Lynn Feild
*Assistant Examiner*—Anthony Q. Edwards
(74) *Attorney, Agent, or Firm*—Morris Manning & Martin; Tim Tingkang Xia, Esq.

(57) ABSTRACT

A device retention mechanism includes a computer chassis (10) having a side panel (12) and a rear panel (14), and a retention member (30) rotatably attached to the side panel. The side and rear panels cooperatively preliminarily attaches a power supply (50) inside the computer chassis. The retention member is rotated about a pivot piece (351) in a direction to urge the power supply toward the rear panel. An engagement point between the power supply and the retention member is below the pivot piece, and the power supply exerts a torque to the retention member in the direction such that the retention member is held in place. The power supply is thus secured inside the computer chassis.

20 Claims, 4 Drawing Sheets

DEVICE RETENTION MECHANISM

BACKGROUND OF THE INVENTION

1. Field of the Invention

The present invention relates to a chassis for an electronic apparatus, and more particularly to a retention mechanism for a device of a computer.

2. Description of the Related Art

The manufacture and assembly of electronic apparatuses has become increasingly more competitive. Manufacturers continually strive to improve the design and features of electronic apparatuses yet still offer competitive prices. One such area of improvement is in the mounting of devices in an electronic apparatus. An electronics apparatus, such as a typical desktop computer, tower, server, and the like, may include electronic devices, such as power supplies, hard disk drives, compact disk read-only memories (CD-ROMs), digital video disc (DVD), floppy disk drives, and the like. These devices are typically added to increase the functionality of the electronic apparatus as desired by a user. However, the installation of such devices in the electronic apparatus may be very labor intensive.

For instance, the installation of a power supply in a computer typically involves the use of screws to attach the power supply to a computer chassis. Usually, these screws are small making them difficult to manipulate and install. It is laborious and time-consuming to manually manipulate the screws. Additionally, because of their small size, the screws may be dropped by an assembler, possibly causing damage to the computer due to shorts, lodging in moving parts, and the like.

To address the aforementioned problems, a plurality of retention mechanisms incorporating brackets is invented. A power supply is first secured in a bracket, then, the bracket is rotatably attached to a computer chassis. However, such a retention mechanism typically needs a necessary bracket, and an additional hinge or the like to enable the bracket rotatable, thereby an undue cost is incurred. Such retention mechanisms are disclosed in Tai Wan Publication No. 354215, and U.S. Pat. Nos. 5,032,952, 5,172,305, 5,745, 342, and 5,777,848.

Another improved type of retention mechanism without use of bracket is disclosed in U.S. Pat. No. 6,582,150, which teaches a retention member pivotably mounted to a first side of a chassis to apply a force against a device, thereby clamping the device between the retention member and a second side of the chassis. Unfortunately, the device is not safely attached to the chassis, because a reverse force that the device applies to the retention member will produce a torque to the retention member in a direction reverse to a direction in which the retention member is rotated to secure the device, thereby the retention member itself has a trend to disengage the device.

SUMMARY OF THE INVENTION

Accordingly, an object of the present invention is to provide a device retention mechanism which can conveniently securely attach a device to a computer chassis.

Another object of the present invention is to provide an easily manufactured and inexpensive device retention mechanism.

To achieve the above objects, a device retention mechanism in accordance with the present invention comprises a computer chassis having a side panel and a rear panel generally perpendicular to the side panel, and a retention member rotatably attached to the side panel by a pivot piece. The side and rear panels cooperatively preliminarily attaches a power supply inside the computer chassis. The retention member is rotated about the pivot piece in a direction to urge the power supply toward the rear panel. An engagement point between the power supply and the retention member is below the pivot piece, and the power supply exerts a torque to the retention member in the direction such that the retention member is held in place. The power supply is thus secured inside the computer chassis.

Other objects, advantages and novel features of the present invention will be drawn from the following detailed description of preferred embodiments of the present invention with the attached drawings, in which:

DETAIL DESCRIPTION OF THE PRESENT INVENTION

Figure 1:
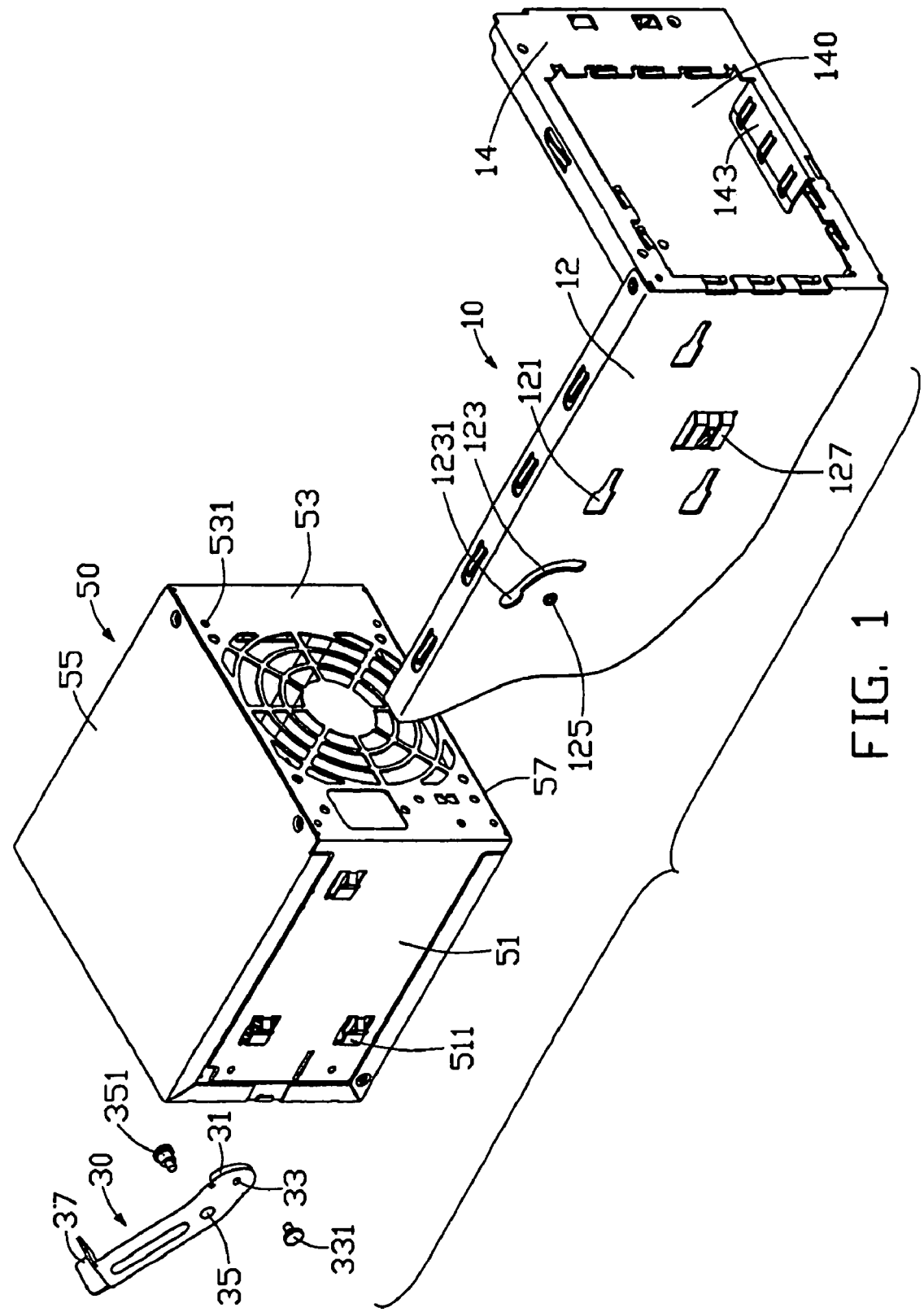
FIG. 1 is an exploded, isometric view of a device retention mechanism in accordance with a preferred embodiment of the present invention.
Figure 2:
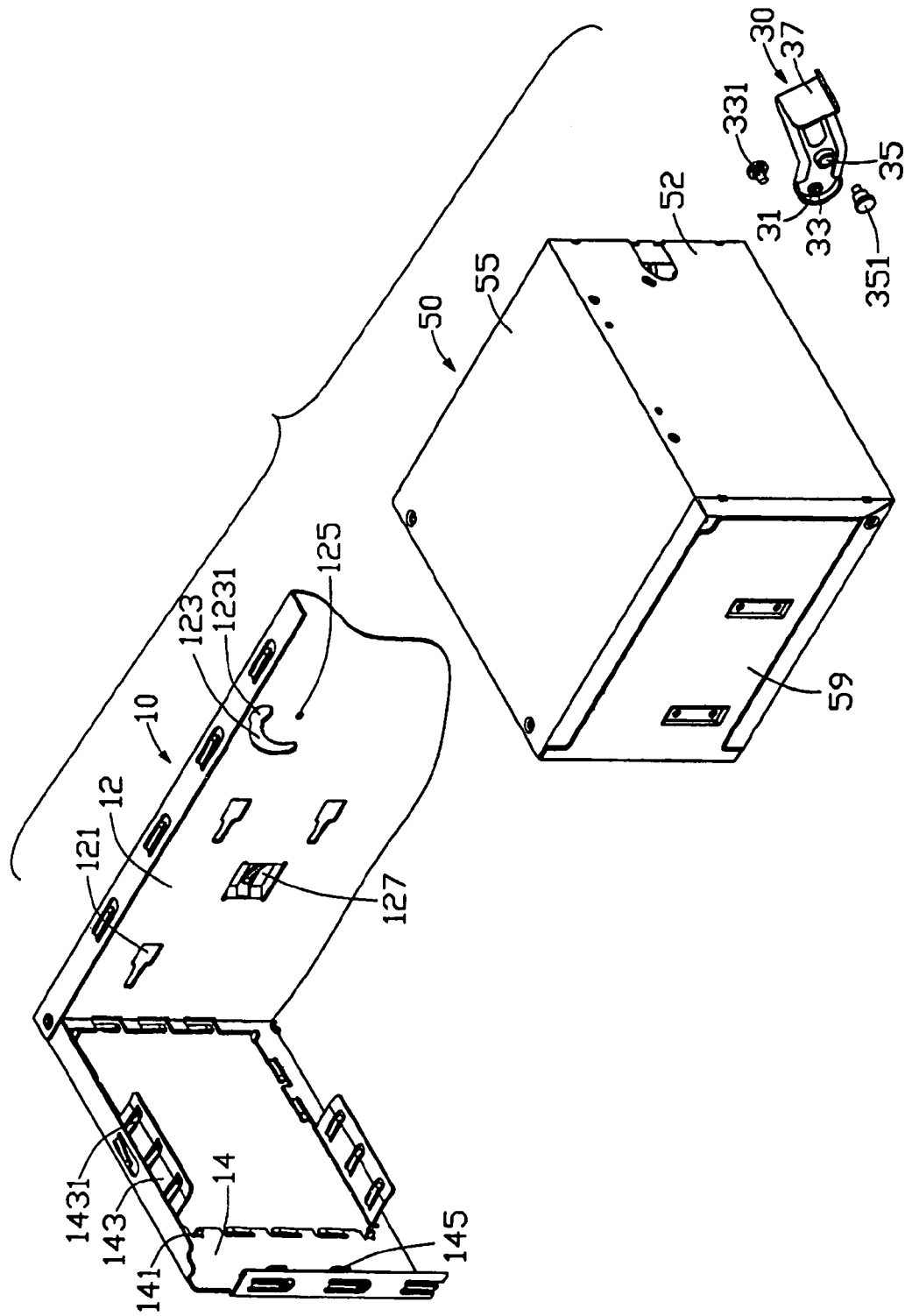
FIG. 2 is similar to FIG. 1, but viewed from another aspect.

Referring to FIGS. 1 and 2, a device retention mechanism in accordance with the preferred embodiment of the present invention is provided for attaching a device, such as a power supply 50, in a computer chassis 10. The device retention mechanism comprises a retention member 30.

The computer chassis 10 comprises a side panel 12, and a rear panel 14 perpendicularly attached to the side panel 12. Three spaced slots 121 are defined in a portion of the side panel 12 proximate to the rear panel 14, each slot 121 comprising a wide portion, and a narrow portion in communication with the wide portion. An arcuate guideway 123 is defined in the side panel 12 adjacent the slots 121. The guideway 123 is located far from the rear panel 14. An entrance hole 1231 is defined as a distal end of the guideway 123. A pivot hole 125 is defined abutting the guideway 123 in a portion where a center of curvature of the guideway 123 locates. A plurality of reinforcing members 127 is formed outside the side panel 12. In the preferred embodiment, only one reinforcing member 127 is shown.

An opening 140 is defined in the rear panel 14, corresponding to the power supply 50. Four pins 141 are bent inwardly from the rear panel 14 adjacent four corners of the opening 140 respectively. A pair of bent plates 143 is formed inwardly from upper and lower ones of edges surrounding the opening 140. A plurality of spring fingers 1431 is formed from the bent plates 143 respectively. A plurality of spring fingers (not labeled) is formed from all the edges surrounding the opening 140. A plurality of tabs 145 is formed at an edge of the rear panel 14 farthest from the side panel 12 of the computer chassis 10.

The retention member 30 is fanned by slightly bending an planar piece having two portions cooperatively defining an obtuse angel therebetween along a common edge sharing by the two portions. A cam-shaped urging portion 31 is formed at a distal end of the retention member 30, the urging portion 31 comprising an arc-shaped flange bent from the distal end. A boss 33 with an internal through hole protrudes outwardly adjacent the urging portion 31, corresponding to the guideway 123 of the side panel 12. Another boss 35 with an internal through hole is formed outwardly adjoining the common edge of the piece, corresponding to the pivot hole 125 of the side panel 12. A guiding piece 331 and a pivot piece 351 are provided for insertion in corresponding entrance hole 1231 and pivot hole 125 via the bosses 33, 35 respectively. It will be understood that the guiding piece 331 and the pivot piece 351 can be integrally formed with the retention member 30. An operating portion 37 is formed at another distal end opposite to the urging portion 31.

The power supply 50 comprises two opposing sidewalls 51, 59, a front wall 52, a rear wall 53, a top wall 55, and a bottom wall 57. Three latches 511 are formed on the sidewall 51, corresponding to the slots 121 of the side panel 12 of the computer chassis 10 respectively. Four pin holes 531 are defined in the rear wall 53 of the power supply 50, corresponding to the pins 141 of the rear panel 14 of the computer chassis 10 respectively.

Figure 3:
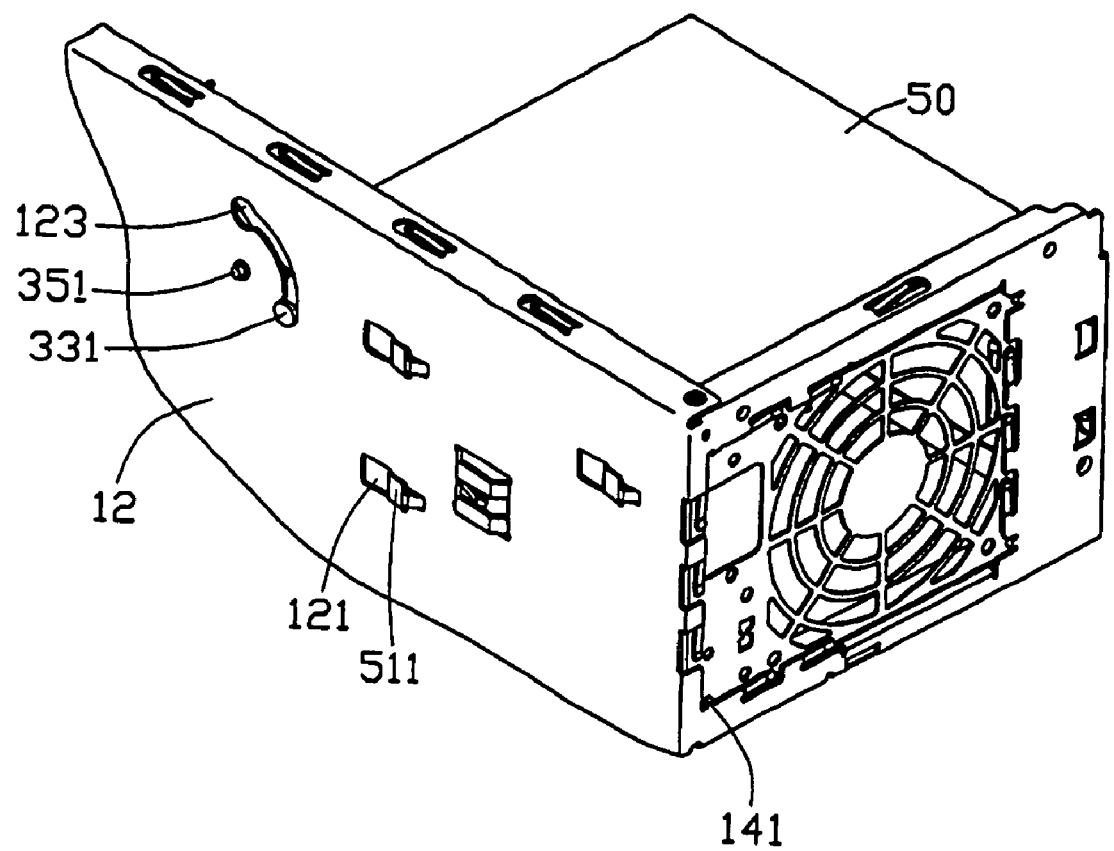
FIG. 3 is an assembled view of FIG. 1.
Figure 4:
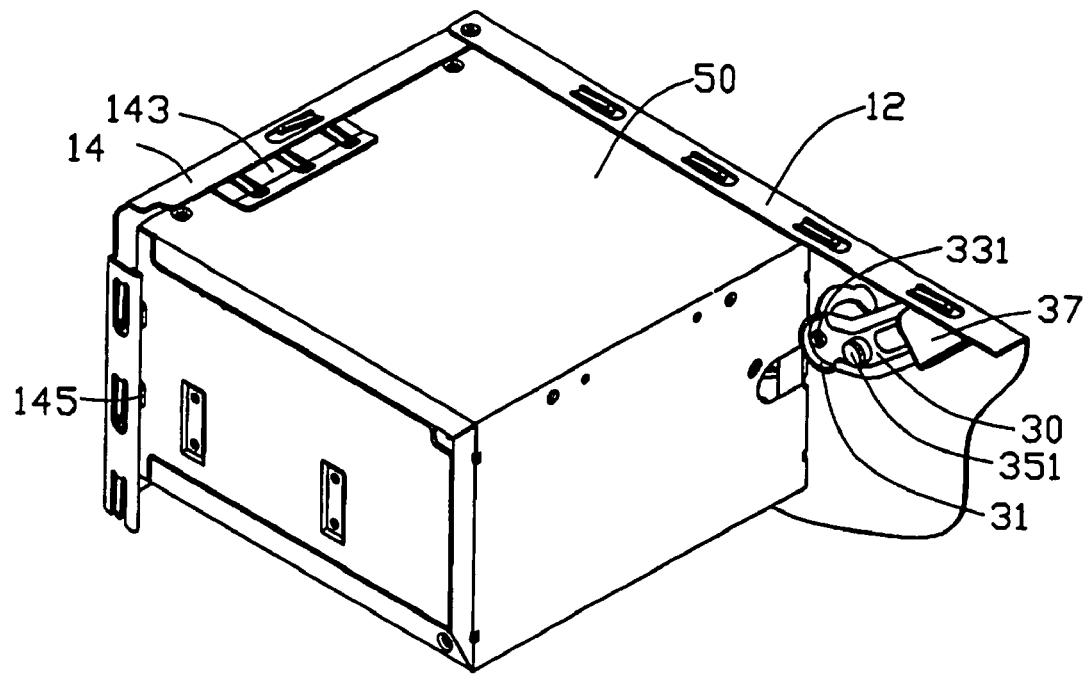
FIG. 4 is similar to FIG. 3, but viewed from another aspect.
Figure 5:
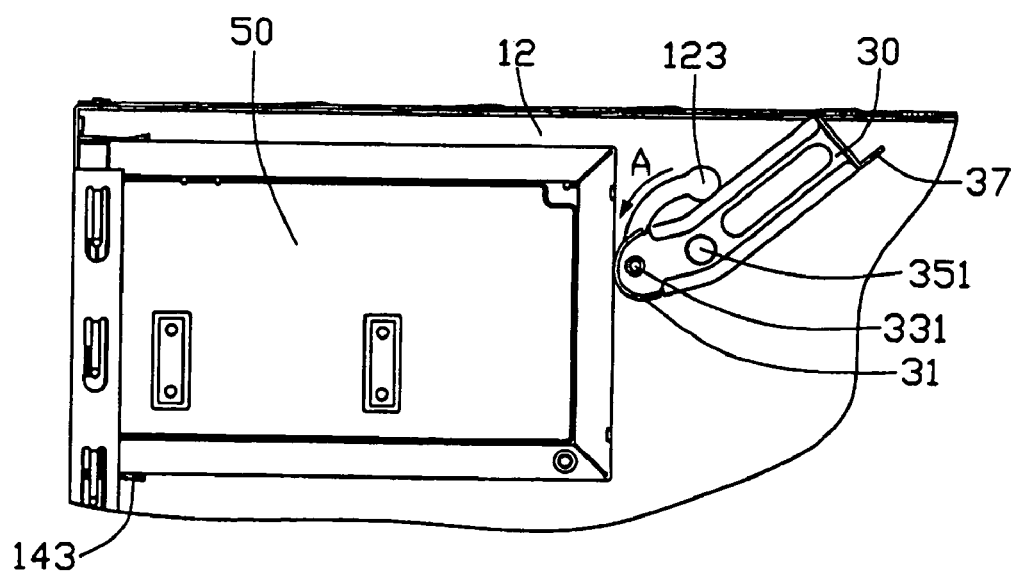
FIG. 5 is a side elevational view of FIG. 4.

Referring to FIGS. 3 to 5, in assembly and use of the device retention mechanism, the guiding piece 331 is snappingly received in the boss 33 of the retention member 30. The retention member 30 is positioned inside the computer chassis 10 abutting the side panel 12 thereof. The pivot piece 351 is extended through the boss 35 to snappingly engage the side panel 12 in the pivot hole 125. A head of the pivot piece 351 is disposed inside the computer chassis 10. A head of the guiding piece 331 is extended through the entrance hole 1231 of the side panel 12 of the computer chassis 10, and is disposed outside the side panel 12. The retention member 30 is then slightly rotated about the pivot piece 351 in an "A" direction as depicted in FIG. 5. The head of the guiding piece 331 is moved out from the entrance hole 1231, and adjoins outside of the side panel 12. The guiding piece 331 and the pivot piece 351 cooperatively rotatably attach the retention member 30 to the side panel 12 inside the computer chassis 10.

In assembly of the power supply 50, the power supply 50 is attached to the side panel 12, with the latches 511 engaging the outside of the side panel 12 via the slots 121. The rear wall 53 of the power supply 50 abuts the rear panel 14 of the computer chassis 10. The pins 141 of the rear panel 14 engage the rear wall 53 in the pin holes 531 respectively. The side wall 59 of the power supply 50 engages the tabs 145 of the rear panel 14. The bent plates 143 of the rear panel 14 engage the top and bottom walls 55, 57 respectively. The power supply 50 is preliminarily attached to the computer chassis 10. The spring fingers 1431 abut against the power supply 50 for preventing EMI.

The retention member 30 is then continually rotated in the "A" direction toward the power supply 50. The urging portion 31 of the retention member 30 urges the power supply 50 toward the rear panel 14 of the computer chassis 10 along the side panel 12. When the guiding piece 331 reaches another distal end of the guideway 123 of the side panel 12 of the computer chassis 10 opposing the entrance hole 1231, the urging portion 31 tightly presses the front wall 52 of the power supply 50 to the rear panel 14. An engagement point of the urging portion 31 of the retention member 30 and the front wall 52 of the power supply 50 is located below the pivot piece 351. A reverse force that the power supply 50 exerts to the urging portion 31 of the retention member 30 imparts a torque in the "A" direction to the retention member 30. The retention member 30 is held in place, thereby blocking the power supply 50 from backward movement and preventing the latches 511 of the power supply 50 and the pins 141 of the rear panel 14 from disengaging out of the corresponding slots 121 of the side panel 12 and the pin holes 531 of the rear wall 53 of the power supply 50 respectively. The power supply 50 is thus securely attached to the computer chassis 10.

To remove the power supply 50, the operating portion 37 is pushed to drive the retention member 30 rotating in a direction reverse to the "A" direction. The retention member 30 disengages from the power supply 50, the power supply 50 is then ready to be detached from the computer chassis 10.

While the present invention has been illustrated by the description of the preferred embodiment thereof, and while the preferred embodiment has been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A device retention mechanism comprising:
a device;
a panel capable of partially enclosing the device and retaining the device beside the panel; and
a retention member pivotally attached to the panel and rotatable in a plane generally parallel to the panel, the retention member capable of urging the device to move along and relative to the panel during rotation thereof, and blocking the device from backward movement after the rotation thereof;
wherein the retention member is rotated in a direction to engage the device, and the device exerts a torque to the retention member in the direction.

2. The device retention mechanism as claimed in claim 1, wherein a plurality of slots is defined in the panel, and a plurality of latches is formed on the device engaging the panel in the slots respectively so as to achieve the retaining of the panel applicable onto the device.

3. The device retention mechanism as claimed in claim 1, wherein a plurality of pins is formed on the panel, and a plurality of holes is defined in the device receiving the pins therein respectively.

4. The device retention mechanism as claimed in claim 1, wherein at least one bent plate is generally bent perpendicularly from the panel supporting the device thereon.

5. The device retention mechanism as claimed in claim 1, wherein a pivot attaches the retention member to the panel.

6. The device retention mechanism as claimed in claim 5, wherein an arcuate guideway is defined in the panel, and a guiding piece is provided to guide rotation of the retention member, corresponding to the guideway.

7. The device retention mechanism as claimed in claim 5, wherein the retention member is formed by slightly bending an planar piece having two portions cooperatively defining an obtuse angel therebetween along a common edge sharing by the two portions.

8. The device retention mechanism as claimed in claim 1, wherein the device is a power supply.

9. A device retention mechanism comprising:
a device;
a computer chassis, the computer chassis comprising a first panel enclosing the device, and a second panel generally perpendicularly attached to the first panel, the first and second panels cooperatively or solely engaging the device in the computer chassis; and a retention member rotatably attached to the first panel by a pivot piece, the retention member urging the device toward the second panel;

wherein an engagement point between the retention member and the device is arranged below the pivot piece to hold the retention member in place by the device thereby securing the device in the computer chassis.

10. The device retention mechanism as claimed in claim 9, wherein the device is a power supply.

11. The device retention mechanism as claimed in claim 9, wherein an arcuate guideway is defined in the first panel, and a guiding piece is extended through the retention member to slide along the guideway.

12. The device retention mechanism as claimed in claim 11, wherein a head of the guiding piece engages an outside of the first panel to help attaching the retention member inside the computer chassis.

13. The device retention mechanism as claimed in claim 12, wherein the guideway of the first panel comprises an entrance hole, corresponding to the head of the guiding piece.

14. The device retention mechanism as claimed in claim 9, wherein a plurality of slots is defined in the first panel, and a plurality of latches is formed on the device corresponding to the slots, the retention member urges the latches of the device to engage into the corresponding slots along the first panel.

15. The device retention mechanism as claimed in claim 9, wherein a pair of bent plates is formed on the second panel clamping one end of the device therebetween.

16. The device retention mechanism as claimed in claim 15, wherein an opening is defined in the second panel between the bent plates, for exposing the end of the device.

17. A computer chassis for retaining an electronic device therein, the computer chassis comprising:

a first panel of the computer chassis;

a second panel of the computer chassis generally perpendicular to the first panel and enclosing an electronic device in the computer chassis jointly with the first panel;

a retaining means arranged at one of the first and second panels, and capable of positioning the electronic device along the one of the first and second panels; and a retention member pivotally attached to the other of the first and second panels, the retention member capable of pressing the electronic device along the other of the first and second panels so as to retain the electronic device therebetween together with the retaining means and position the electronic device beside the first and second panels;

wherein the electronic device generates a rotation toque to the retention member, a blocking means prevents the retention member from rotating under said rotation toque.

18. The computer chassis as described in claim 17, wherein the blocking means comprises a post arranged at the retention member, and a guideway defined in said one of the panels which the retention member is attached to, and wherein a distal end of the guideway prevents the electronic device from rotation under said rotation toque.

19. The computer chassis as described in claim 17, wherein the retaining means comprises a plurality of slots, and wherein the electronic device forms a plurality of latches to engage in the slots.

20. The computer chassis as described in claim 9, wherein a plurality of pins is formed on the second panel, and a plurality of holes is defined in the device receiving the pins respectively, thereby the second panel engaging the device in the computer chassis.

* * * * *